May 25, 1943.  R. R. HARMON  2,319,814
GAS AND LIQUID CONTACT APPARATUS
Filed July 9, 1941  3 Sheets-Sheet 1
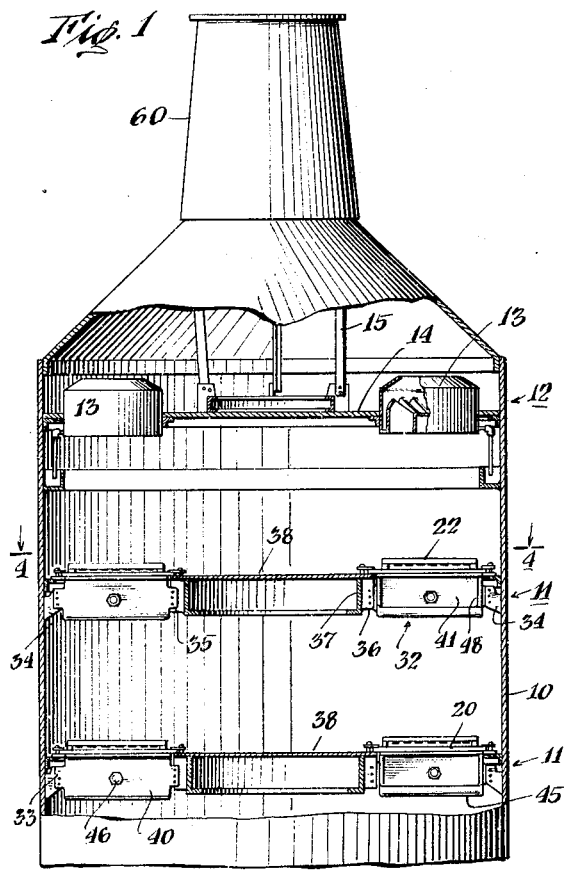
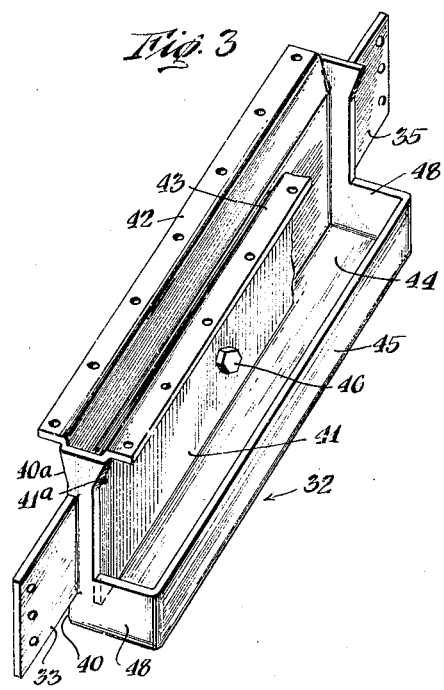
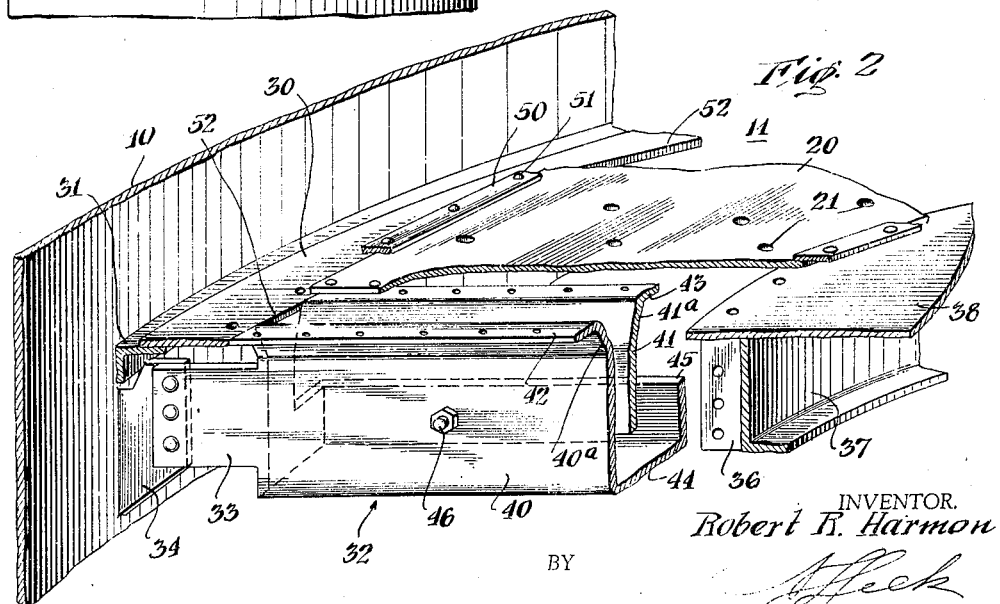
INVENTOR.
Robert R. Harmon
BY
ATTORNEY

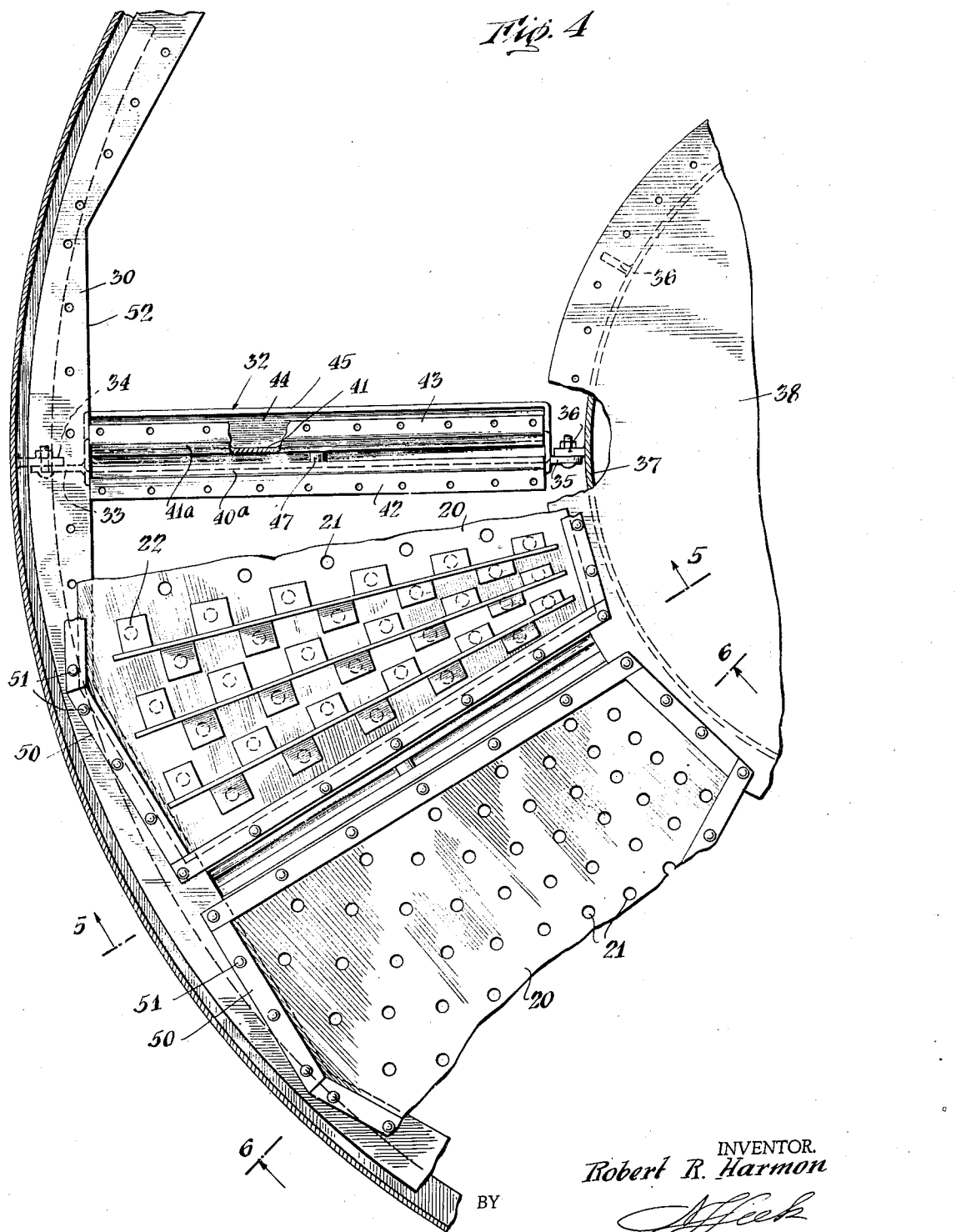

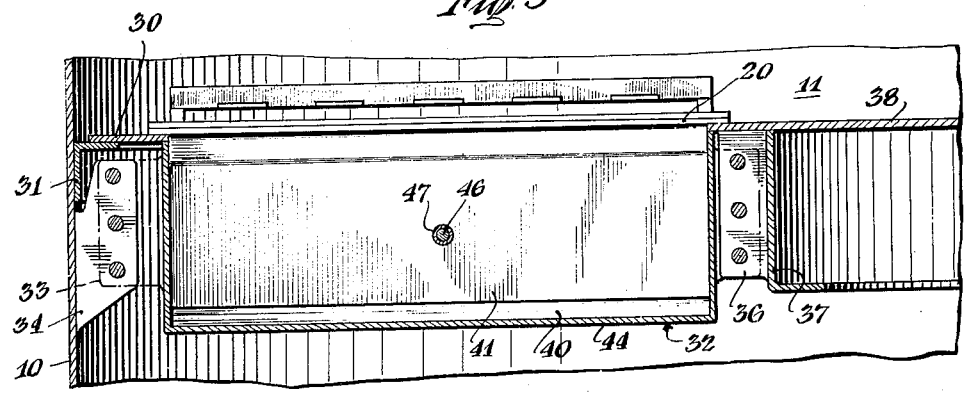
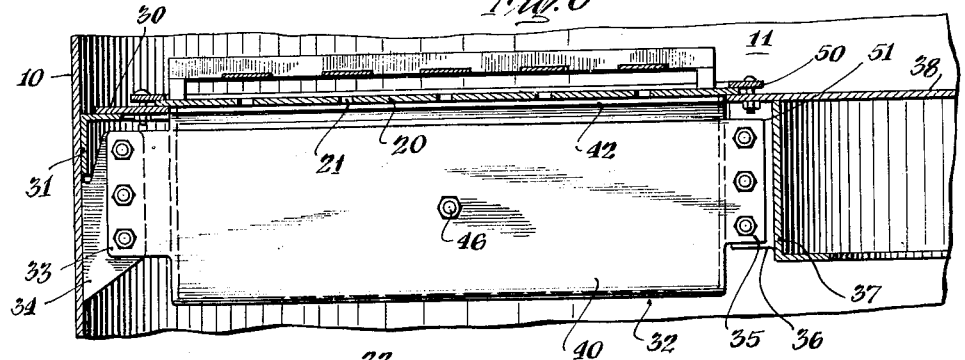
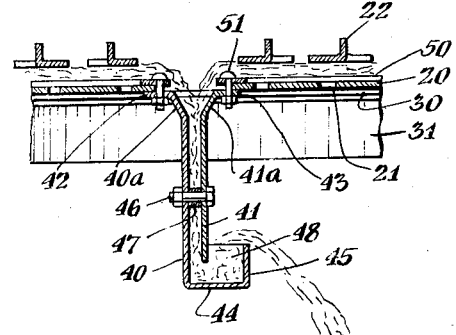
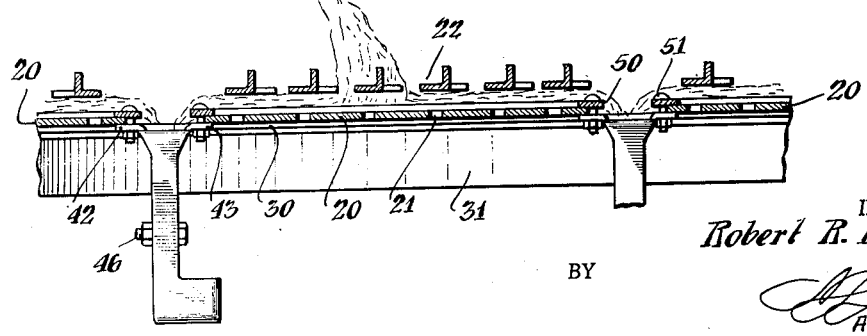

Patented May 25, 1943

2,319,814

UNITED STATES PATENT OFFICE 2,319,814

GAS AND LIQUID CONTACT APPARATUS

Robert R. Harmon, Charlottesville, Va., assignor to Peabody Engineering Corporation, New York, N. Y., a corporation of New York Application July 9, 1941, Serial No. 401,558

13 Claims. (Cl. 261—113)

This invention relates to gas and liquid contact apparatus of the type having one or a plurality of diaphragms containing apertures forming orifices through which the gas passes upwardly at a velocity suited to prevent the liquid on said diaphragms from passing downwardly through said orifices. Such apparatus may be for cleaning gases, for cooling, or for liquid-gas contact purposes.

In one embodiment the apparatus embodies baffles above each orifice against which the gas impinges for the removal of suspended particles and/or for increasing the time of contact between the gas and liquid. An apparatus of this general type suited for use as a scrubber is disclosed in my Patent 2,226,128, dated December 24, 1940.

It is an object of the present invention to provide in an apparatus of the above type, for the efficient control and distribution of the liquid blanket on the perforated diaphragms.

Another object is to provide an apparatus of the above type having novel and improved details of construction and features of operation.

Another object is to provide an apparatus of the above type which is suited to large-size commercial installations.

Various other objects and advantages will be apparent as the nature of the invention is more fully disclosed.

In one embodiment the invention comprises an upright cylindrical casing having a plurality of vertically spaced perforated diaphragms therein. Each diaphragm is formed by a plurality of segmental plates having apertures therein forming orifices for the purpose above mentioned. The shell or casing is provided with an internal annular ledge, and a central imperforate plate is supported in alignment with said ledge by a plurality of radial members, each of which forms an overflow duct. The segmental plates are attached to the annular ledge, to the central plate and to the radial members.

The radial members may comprise two side members forming an overflow duct through which the overflow liquid passes downwardly. One of the side members may be formed with a bottom having an upturned lip over which the liquid is discharged. The overflow ducts are so arranged that the blanket of water or other liquid on the various diaphragms flows from each radial edge of each segmental plate over a weir into the radial overflow duct and is then discharged over the bottom lip onto the adjacent diaphragm. The bottom lip of the overflow duct provides a liquid seal which prevents passage of gases upwardly therethrough so that all of the gases are caused to pass through the various orifices in the diaphragms. The overflow ducts in the different vertical zones are relatively offset so that the liquid is discharged therefrom onto about the center of the segmental plate below. The weir arrangement is such that the liquid is handled by the device without maintaining the liquid blanket on said diaphragms sufficiently thick to form a hydrostatic head which introduces an undue resistance to the gas flow.

The novel features which are believed to be characteristic of this invention are pointed out more particularly in the claims appended hereto. The invention itself, however, may be better understood by referring to the following description, taken in connection with the accompanying drawings in which a specific embodiment thereof has been set forth for purposes of illustration.

In the drawings,

Fig. 1 is a side elevation of a gas scrubber embodying the present invention, with parts broken away to show the construction thereof;

Fig. 2 is a perspective detail view showing the mechanical construction of a diaphragm;

Fig. 3 is a perspective view of an overflow duct;

Fig. 4 is an enlarged transverse section taken on the line 4—4 of Fig. 1 with the parts progressively broken away;

Figs. 5 and 6 are vertical sections taken on the lines 5—5 and 6—6 respectively of Fig. 4; and Fig. 7 is a detail view showing the relative arrangement of the overflow ducts and two vertically spaced diaphragms.

In the following description and in the claims certain specific terms are used for convenience in referring to various details of the invention. It is to be understood, however, that these terms are to be given as broad an interpretation as the state of the art will permit.

Referring to the drawings more in detail, the invention is shown as applied to a gas scrubber comprising a vertical cylindrical housing or casing 10 having one or more cleaning or cooling zones 11, a drying zone 12, and an upper gas discharge duct 60.

The drying zone 12 may comprise a plurality of centrifugal driers 13 of the type disclosed in my patent above mentioned, having a plurality of radial vanes therein adapted to cause the gases to pass upwardly therethrough at an increasing velocity and to rotate so as to remove droplets of entrained liquid centrifugally. The driers 13 are shown as mounted in a plate 14 which is supported peripherally by the shell 10 and centrally by a plurality of struts 15 which extend to the top of said shell.

Each cleaning zone 11 is shown as comprising a plurality of segemental diaphragm plates 20 having apertures 21 therein forming orifices through which the gases pass, and having a plurality of baffles 22 disposed above said orifices and against which the gases impinge as they pass upwardly therethrough. Said baffles may be supported in any convenient manner as shown more in detail in my patent above mentioned.

In accordance with the present invention, a horizontal ledge 30 is attached to the inner wall of the shell 10 by convenient means shown as an annular angle member 31. A plurality of radial members 32 to be described, are provided with ears 33 which are attached to ears 34 secured to the shell 10, and with ears 35 which are attached to gusset plates 36 carried by the vertical flange 37 of a central imperforate plate 38. The construction is such that the central plate 38 is supported by said radial members 32.

Each radial member 32 comprises a pair of side plates 40 and 41, flared outwardly at their upper ends as at 40a, 41a and having top horizontal flanges 42 and 43 respectively. The side plate 40 is shown as provided with a bottom horizontal flange 44 and an upturned lip 45 forming a bottom trough. The side plate 41 extends downwardly into said trough to form a liquid seal and is secured in spaced relationship to said plate 40 by suitable means shown as bolts 46 and spacers 47. Suitable end pieces 48 are attached to the side plates 40 and 41 by suitable means or are formed integrally therewith. The end pieces 48 are flush at their top surface with the under surfaces of the flanges 42 and 43 and are offset therefrom to engage when assembled, as shown in Fig. 2, the under surfaces of the horizontal ledge 30 and the central plate 38 respectively. The ears 33 and 34 may be formed as a part of the side plate 40.

The radial members 32 are assembled so that the top surfaces of the flanges 42 and 43 are flush with the top surfaces of the horizontal ledge 30 and the central plate 38, and the end pieces 48 extend beneath said horizontal ledge 30 and plate 38 to form a fluid tight seal. Each segmental plate 20 extends between adjacent radial members 32 and rests at its outer end on the horizontal ledge 30, at its inner end on the central plate 38, and along its side edges on the flanges 42 and 43 of adjacent radial members, being secured thereto by suitable means shown as bolts 51 and clamping strips 50 forming weirs to control the depth of the liquid blanket on the diaphragms. The use of weirs in the form of clamping strips also facilitates the assembling of the device as in this way the necessity for drilling accurately spaced holes along the edges of the segmental plates is avoided.

In the embodiment shown, the horizontal ledge 30 is provided with straight inner edges 52 to facilitate attachment to the corresponding edges of plates 20. It is to be understood, however, that the inner edge 52 may be circular in form, if desired, in which event the outer edges of the plates 20 may be similarly shaped or may be provided with sufficient overlap so as to contact with the circular ledge.

Operation

In the operation of this device, water or other cooling liquid is supplied to the upper cleaning zone 11 by suitable means not shown and forms a blanket on the segmental plates 20 of said upper zone. The water overflows from both sides of said plates over weirs 50 into the radial ducts 32, passing downwardly through said ducts to form a water seal, as indicated in Fig. 7, and overflows onto the plates 20 of the next lower cleaning zone.

It is to be noted that the side plates 40 and 41 are flared as at 40a and 41a at their upper ends to form an enlarged opening through which the water flows from the plates 20. This enlarged opening increases the capacity of the radial ducts and eliminates the formation of eddy currents which would interfere with such flow.

The gases are introduced at the lower end of the casing 10 and pass upwardly through the apertures 21 in the plates 20 of one cleaning zone and through the blanket of liquid on said plates, impinging against the baffles 22, then passing upwardly to the next cleaning zone. After passage over the various cleaning zones, the gases pass through the driers 13 wherein the entrained droplets of cleaning liquid are removed, after which the dried gases are discharged through the discharge duct 60 at the top of the casing.

A sufficient quantity of liquid must be introduced to the gas stream for the purpose specified and at the same time the thickness of the blanket of liquid on each of the plates 20 must be so restricted as to reduce the hydrostatic head of the liquid through which the gases must pass to a value such that excessive resistance to the flow of gas is avoided. In the embodiment shown this is accomplished by causing the liquid to overflow the weirs 50 of suitable height into the various ducts 32 and to be withdrawn therethrough. It is to be noted that the sectional area of the overflow ducts between the plates 40 and 41 should be small in relation to the cross-sectional area of the trough created by the up-turned lip 45 so as to maintain a sufficient depth of liquid in the duct to produce a hydrostatic head slightly greater than the differential pressure of the gas below and above the perforated diaphragm. Otherwise, the gas pressure would cause the water seal to blow out, thereby not only permitting the free passage of the gas through the seal itself, but preventing free discharge of liquid from the diaphragm. In view of the relatively smaller cross sectional area of each overflow duct, the flared opening at the top of the duct is preferred in order to insure an adequate flow of water thereto.

It is to be understood that in certain instances a single contact or cleaning zone may be sufficient. Furthermore, in such apparatus the baffles 22 may be omitted if desired. In installations which require a plurality of such contact or cleaning zones, however, overflow ducts of successive zones are offset as shown in Fig. 7 so that liquid overflowing from one such duct is supplied to about the center of a segmental plate below and is thereby caused to flow evenly to the radial weirs 50 at each side of such lower plate, thus assuring good water distribution over the entire shell section and avoiding any tendency of the water to channel or eddy due to uneven discharge onto the plates or due to uneven flow across the plates.

Although a specific embodiment of the invention has been shown for purposes of illustration, it is to be understood that the invention is capable of various uses and that changes and modifications may be made therein as will be readily apparent to a person skilled in the art. The invention is only to be limited in accordance with the scope of the following claims.

What is claimed is:

1. In a gas and liquid contact apparatus, a treating zone comprising a diaphragm containing orifices through which the gas to be treated passes at a velocity suited to maintain a blanket of liquid thereon, said diaphragm comprising a plurality of segmental plates, a supply member supplying liquid to an intermediate part of each plate for flowing circumferentially in two directions thereover, and radial members extending along the side edges of and between said plates, said radial members each comprising an overflow duct through which the liquid overflows from the side edges of the two adjacent plates.

2. In a gas and liquid contact apparatus, a treating zone comprising a diaphragm containing orifices through which the gas to be treated passes at a velocity suited to maintain a blanket of liquid thereon, said diaphragm comprising a plurality of segmental plates, a supply member supplying liquid to an intermediate part of each plate for flowing circumferentially in two directions thereover, and radial members extending along the side edges of and between said plates, said radial members each comprising an overflow duct through which the liquid overflows from the side edges of the two adjacent plates, said ducts having inlet weirs controlling the depth of the liquid blanket on said diaphragm.

3. In a gas and liquid contact apparatus, a treating zone comprising a diaphragm containing orifices through which the gas to be treated passes at a velocity suited to maintain a blanket of liquid thereon, said diaphragm comprising a plurality of segmental plates, a supply member supplying liquid to an intermediate part of each plate for flowing circumferentially in two directions thereover, and radial members extending along the side edges of and between said plates, said radial members each comprising an overflow duct through which the liquid overflows from the side edges of the two adjacent plates, said ducts having means maintaining a liquid seal under a hydrostatic pressure suited to prevent passage of said gases therethrough.

4. In a gas and liquid contact apparatus, a treating zone comprising a diaphragm containing orifices through which the gas to be treated passes at a velocity suited to maintain a blanket of liquid thereon, said diaphragm comprising a plurality of segmental plates, a supply member supplying liquid to an intermediate part of each plate for flowing circumferentially in two directions thereover, and radial members extending along the side edges of and between said plates, said radial members each comprising an overflow duct through which the liquid overflows from the side edges of the two adjacent plates, said ducts having flared openings at the top suited to receive said overflow liquid without turbulence, whereby a complete hydrostatic seal is effected.

5. In a gas and liquid contact apparatus, a treating zone comprising a diaphragm containing orifices through which the gas to be treated passes at a velocity suited to maintain a blanket of liquid thereon, said diaphragm comprising a plurality of segmental plates, a supply member supplying liquid to an intermediate part of each plate for flowing circumferentially in two directions thereover, and radial members extending along the side edges of and between said plates, said radial members each comprising an overflow duct through which the liquid overflows from the side edges of the two adjacent plates, said ducts having flared openings at the top suited to receive said overflow liquid without turbulence, whereby a complete hydrostatic seal is effected, said ducts having inlet weirs controlling the depth of the liquid blanket on said diaphragm.

6. In a gas cleaning apparatus, a plurality of vertically spaced cleaning zones, each zone comprising a transverse diaphragm having a plurality of apertures forming orifices through which the gas passes at a velocity suited to maintain a liquid blanket thereon, a plurality of radially extending overflow ducts associated with each diaphragm, the overflow ducts of the diaphragms of adjacent zones being offset so that the liquid discharged from one zone is applied to the adjacent diaphragm about centrally between the overflow ducts of said last diaphragm.

7. In a gas cleaning apparatus, a plurality of vertically spaced cleaning zones, each zone comprising a transverse diaphragm having a plurality of apertures forming orifices through which the gas passes at a velocity suited to maintain a liquid blanket thereon, a plurality of radially extending overflow ducts associated with each diaphragm, the overflow ducts of the diaphragms of adjacent zones being offset so that the liquid discharged from one zone is applied to the adjacent diaphragm about centrally between the overflow ducts of said last diaphragm, said overflow ducts having means maintaining a liquid seal to prevent passage of gases therethrough.

8. A gas cleaning apparatus comprising a cylindrical upright casing and a plurality of cleaning zones therein, each zone comprising an internal horizontal ledge secured to said casing, a central imperforate plate, radial members supporting said plate and extending between said plate and said casing, said radial members comprising overflow ducts formed by spaced radial side plates having horizontal top flanges and being mounted with said top flanges flush with said horizontal ledge and with said central plate, and segmental orifice plates having side edges, outer edges and inner edges respectively secured to said flanges, said ledge and said central plate.

9. A gas cleaning apparatus comprising a cylindrical upright casing and a plurality of cleaning zones therein, each zone comprising an internal horizontal ledge secured to said casing, a central imperforate plate, radial members supporting said plate and extending between said plate and said casing, said radial members comprising overflow ducts formed by spaced radial side plates having horizontal top flanges and being mounted with said top flanges flush with said horizontal ledge and with said central plate, and segmental orifice plates having side edges, outer edges and inner edges respectively secured to said flanges, said ledge and said central plate, and marginal strips overlying said segmental orifice plates to form weirs controlling the depth of liquid blanket thereon.

10. A gas cleaning apparatus comprising a cylindrical upright casing and a plurality of cleaning zones therein, each zone comprising an internal horizontal ledge secured to said casing, a central imperforate plate, radial members supporting said plate and extending between said plate and said casing, said radial members comprising overflow ducts formed by spaced radial side plates having horizontal top flanges and being mounted with said top flanges flush with said horizontal ledge and with said central plate, and segmental orifice plates having side edges, outer edges and inner edges respectively secured to said flanges, said ledge and said central plate, said ducts being formed at their lower ends with a trough suited to maintain a liquid seal.

11. A gas cleaning apparatus comprising a cylindrical upright casing and a plurality of cleaning zones therein, each zone comprising an internal horizontal ledge secured to said casing, a central imperforate plate, radial members supporting said plate and extending between said plate and said casing, said radial members comprising overflow ducts formed by spaced radial side plates having horizontal top flanges and being mounted with said top flanges flush with said horizontal ledge and with said central plate, and segmental orifice plates having side edges, outer edges and inner edges respectively secured to said flanges, said ledge and said central plate, said ducts being formed at their lower ends with an upturned lip over which the liquid flows onto the plate below, said lip forming a trough suited to maintain a liquid seal.

12. Gas cleaning apparatus comprising an outer shell, an inner imperforate plate, a plurality of radial overflow ducts extending between said shell and said plate and connected to support said plate and orifice plates mounted on and supported by said ducts, said orifice plates having a plurality of openings forming orifices through which gases pass at a velocity suited to maintain thereon a blanket of liquid which overflows into said ducts and is discharged thereby.

13. Gas cleaning apparatus comprising an outer shell, an inner imperforate plate, a plurality of radial overflow ducts extending between said shell and said plate and connected to support said plate, and orifice plates mounted on and supported by said ducts, said orifice plates having a plurality of openings forming orifices through which gases pass at a velocity suited to maintain thereon a blanket of liquid which overflows into said ducts and is discharged thereby, and overflow weirs associated with said orifice plates to control the depth of said blanket.

ROBERT R. HARMON.